(12) United States Patent
Shaikh et al.

(10) Patent No.: US 10,987,994 B2
(45) Date of Patent: Apr. 27, 2021

(54) AIR-CONDITIONING SYSTEM AND CLIMATE CONTROL METHOD FOR A FUEL CELL VEHICLE

(71) Applicant: Ford Global Technologies, LLC, Dearborn, MI (US)

(72) Inventors: Furqan Zafar Shaikh, Troy, MI (US); Sunil Katragadda, Canton, MI (US); Michael Levin, Ann Arbor, MI (US); William Frederick Sanderson, Commerce Township, MI (US); Craig Winfield Peterson, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 303 days.

(21) Appl. No.: 15/906,103

(22) Filed: Feb. 27, 2018

(65) Prior Publication Data

US 2019/0111758 A1    Apr. 18, 2019

Related U.S. Application Data

(60) Provisional application No. 62/573,439, filed on Oct. 17, 2017.

(51) Int. Cl.
*B60H 1/00* (2006.01)
*B60H 1/32* (2006.01)

(52) U.S. Cl.
CPC ..... *B60H 1/00392* (2013.01); *B60H 1/00278* (2013.01); *B60H 1/32014* (2019.05); *B60H 2001/00307* (2013.01)

(58) Field of Classification Search
CPC ........... B60H 1/00392; B60H 1/00385; B60H 1/32014; B60H 1/3201; B60H 1/00278; B60H 1/00271; B60H 2001/00307
See application file for complete search history.

(56) References Cited

U.S. PATENT DOCUMENTS

| | | | |
|---|---|---|---|
| 8,511,111 B2 | 8/2013 | Lambert et al. | |
| 8,661,800 B2 | 3/2014 | Levin et al. | |
| 8,707,729 B2 | 4/2014 | Schmidt et al. | |
| 8,763,418 B2* | 7/2014 | Kim | B60H 1/00278 62/305 |
| 9,080,796 B2 | 7/2015 | Shaikh et al. | |
| 2016/0257181 A1* | 9/2016 | Zhou | B60H 1/32014 |
| 2016/0290216 A1* | 10/2016 | Katragadda | F01P 11/16 |
| 2016/0297281 A1 | 10/2016 | Levin et al. | |
| 2017/0120725 A1 | 5/2017 | Zhou et al. | |

* cited by examiner

*Primary Examiner* — Tavia Sullens
(74) *Attorney, Agent, or Firm* — David Coppiellie; Price Heneveld LLP

(57) ABSTRACT

An air-conditioning system and method of climate control for a fuel cell vehicle are provided herein. The system and method include a vacuum enclosure having an adsorber and an evaporator/condenser assembly. A conduit and valve system operates the air-conditioning system in two modes of operation to provide uninterrupted cooling to a passenger cabin, among other things. In one mode of operation, the adsorber is regenerated using waste heat from a fuel cell stack.

17 Claims, 3 Drawing Sheets

AIR-CONDITIONING SYSTEM AND CLIMATE CONTROL METHOD FOR A FUEL CELL VEHICLE

CROSS-REFERENCE TO RELATED APPLICATION

This application claims priority to U.S. Provisional Application No. 62/573,439, filed on Oct. 17, 2017, entitled "AIR CONDITIONING SYSTEM AND CLIMATE CONTROL METHOD FOR A FUEL CELL VEHICLE," the entire disclosure of which is hereby incorporated by reference.

FIELD OF THE INVENTION

The present disclosure generally relates to an air-conditioning (AC) system. More specifically, the present disclosure relates to an air-conditioning system for a fuel cell vehicle.

BACKGROUND OF THE INVENTION

In current electric vehicles, the air-conditioning system relies entirely on the onboard vehicle battery pack. For example, a fuel cell vehicle typically utilizes an electric compressor driven AC system. As a consequence, unwanted battery drain is experienced while the air-conditioning system is active, thereby limiting the driving range of the fuel cell vehicle. Accordingly, there is a need for an air-conditioning system that promotes better fuel economy when used. The present disclosure is intended to satisfy this need.

SUMMARY OF THE INVENTION

According to one embodiment of the present disclosure, an air-conditioning system for a fuel cell vehicle is provided. The air-conditioning system includes a vacuum enclosure having an adsorber in thermal communication with a first heat exchange conduit and an evaporator/condenser assembly in thermal communication with a second heat exchange conduit, a first and second radiator, a core, a vessel containing a phase change material upstream of the core, a fuel cell stack, and a conduit and valve system. The conduit and valve system is configured to circulate a first heat exchange fluid through the first radiator and the first heat exchange conduit, a second heat exchange fluid through the second heat exchange conduit, the vessel, and the core, and a third heat exchange fluid from the fuel cell stack to the second radiator in a first mode of operation. The conduit and valve system is also configured to circulate the first heat exchange fluid through the first radiator and the second heat exchange conduit, the second heat exchange fluid through the vessel and the core, and at least a portion of the third heat exchange fluid from the fuel cell stack to the vacuum enclosure in a second mode of operation.

According to another embodiment of the present disclosure, an air-conditioning system for a fuel cell vehicle is provided. The air-conditioning system includes a vacuum enclosure having an adsorber in thermal communication with a first heat exchange conduit and an evaporator/condenser assembly in thermal communication with a second heat exchange conduit, a first and second radiator, a core, a vessel containing a phase change material upstream of the core, a fuel cell stack, and a first, second, and third pump. A first flow loop is provided where the first pump circulates a first heat exchange fluid through the first radiator and the first heat exchange conduit to remove a heat of adsorption from the adsorber. A second flow loop is provided where a second pump circulates a second heat exchange fluid through the second heat exchange conduit, the vessel, and the core to provide cooling to a passenger cabin. A third flow loop is provided where the first pump circulates the first heat exchange fluid through the first radiator and the second heat exchange conduit to remove a heat of condensation from the evaporator/condenser assembly. A fourth flow loop is provided where the second pump circulates the second heat exchange fluid through the vessel and the core while bypassing the second heat exchange conduit to provide cooling to the passenger cabin. Also included is a regeneration circuit where a third heat exchange fluid is diverted at an outlet of the fuel cell stack and circulated into the vacuum enclosure to regenerate the adsorber. A conduit and valve system is configured to control the flow of the first, second, and third heat exchange fluids as the air-conditioning system cycles between a first mode of operation and a second mode of operation.

According to yet another embodiment of the present disclosure, a method of climate for a fuel cell vehicle is provided. The method includes the step of circulating a first heat exchange fluid through a first radiator and a first heat exchange conduit, a second heat exchange fluid through a second heat exchange conduit, a vessel, and a core, and a third heat exchange fluid from a fuel cell stack to a second radiator in a first mode of operation. The method also includes the step of circulating the first heat exchange fluid through the first radiator and the second heat exchange conduit, the second heat exchange fluid through the vessel and the core, and at least a portion of the third heat exchange fluid from a fuel cell stack to a vacuum enclosure in a second mode of operation. The vacuum enclosure contains an adsorber in thermal communication with the first heat exchange conduit, an evaporator/condenser assembly in thermal communication with the second heat exchange conduit, and a refrigerant.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

Figure 1:
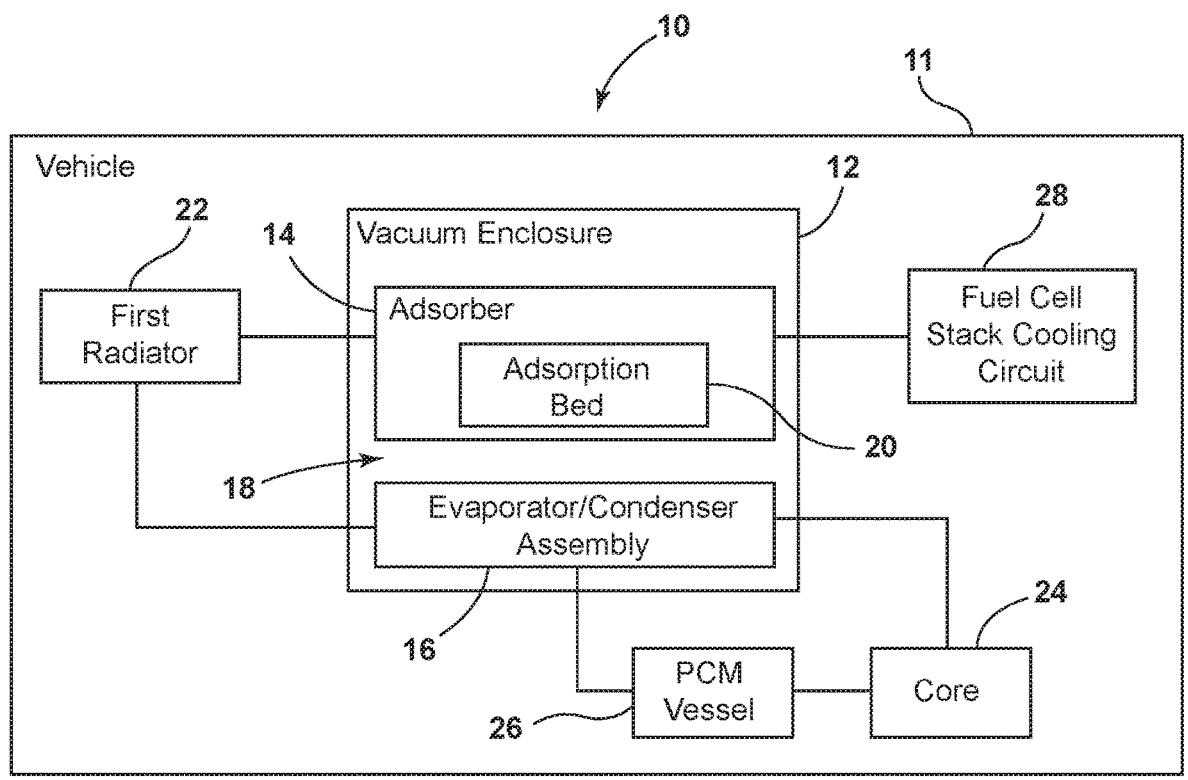
FIG. 1 is a schematic block diagram of an air-conditioning system for a fuel cell vehicle.

Referring to FIG. 1, an air-conditioning system 10 of a fuel cell vehicle 11 is shown and includes a vacuum enclosure 12, an adsorber 14, an evaporator/condenser assembly 16, and a refrigerant 18. The adsorber 14, the evaporator/condenser assembly 16, and the refrigerant 18 are all held in the vacuum enclosure 12. The adsorber 14 includes an adsorption bed 20 for adsorbing and storing refrigerant vapor. As a non-limiting example, the adsorption bed 20 may include a number of plates coated with a desiccant such as a zeolite, a metal organic framework (MOF), or other appropriate type. In operation, the evaporator/condenser assembly 16 functions as a liquid refrigerant storage device, and depending upon the pressure and temperature of the vacuum enclosure 12, either evaporates liquid or condenses vapor. Typically, the adsorber 14 and the evaporator/condenser assembly 16 are generally separated by a thermal barrier constructed in a manner to minimize resistance to vapor flow. In one possible embodiment, the refrigerant 18 is water, which has a high latent heat of evaporation. However, it is to be understood that other refrigerants could also be used. Those other refrigerants include, but are not limited to, ammonia, methanol/water or other commonly used automotive refrigerants such as R1234yf. As will be apparent from the following description, the refrigerant 18 goes back and forth as a vapor and a liquid between the adsorber 14 and the evaporator/condenser assembly 16.

With continued reference to FIG. 1, the air-conditioning system 10 also includes a first radiator 22, a core 24, a phase change material (PCM) vessel 26, and a fuel cell stack cooling circuit 28, all of which will be described in greater detail below. Advantageously, the first radiator 22 effectively replaces the condenser in a state-of-the-art vehicle air-conditioning system and the core 24 effectively replaces the evaporator in a state-of-the-art vehicle air-conditioning system. Additionally, the air-conditioning system 10 benefits from a reduced system operating pressure for circulating ecofriendly heat exchange fluids that may include deionized water, ethylene glycol-water, and the like. In an exemplary embodiment, the heat exchange fluids described herein include an equal part mixture of deionized water, ethylene glycol, and water.

The air-conditioning system 10 includes two modes of operation. In the first or adsorption/evaporation mode of operation illustrated in FIG. 2, a first pump 30 circulates a first heat exchange fluid through a plurality of conduits collectively defining a first flow path denoted by action arrows A for clarity and ease of understanding. Specifically, the first heat exchange fluid is circulated from the first radiator 22, where it is cooled, through a first heat exchange conduit 32 in thermal communication with the adsorber 14. As a result, the adsorber 14 is cooled to remove the heat of adsorption from the adsorber 14. Heat from the cooling of the first heat exchange fluid is rejected to the environment through the first radiator 22 using a first blower 33. The cooling of the adsorber 14 reduces the absolute pressure inside the vacuum enclosure 12 (e.g., to approximately 0.5-1.0 kPa range). This enables the adsorber 14 to draw and store refrigerant vapor. For example, the reduction of the pressure inside the vacuum enclosure 12 to the saturation pressure level of the refrigerant 18 and the refrigerant vapor suctioned by the adsorber 14 produce intense evaporation of the refrigerant 18 on the surfaces of the plates of the adsorption bed 20 and the evaporator/condenser assembly 16. The refrigerant vapor generated in the vacuum enclosure 12 is transported to and stored on the plates.

During the first mode of operation, a second heat exchange fluid is circulated by a second pump 34 through a plurality of conduits collectively defining a second flow path denoted by action arrows B for clarity and ease of understanding. Specifically, the second heat exchange fluid is circulated through a second heat exchange conduit 36 in thermal communication with the evaporator/condenser assembly 16 and through the PCM vessel 26 and the core 24. The second heat exchange fluid is cooled by the evaporator/condenser assembly 16 and serves to freeze the phase change material in the PCM vessel 26. In turn, the second heat exchange fluid is circulated to the core 24 and cools the core 24 (e.g., to approximately 5°-7° C. temperature range) for heat exchange with air being circulated through a passenger cabin 38 of the vehicle 11. A second blower 40, such as an HVAC fan, forces air through the core 24 and then into the passenger cabin 38 to provide cooling for the vehicle occupants. As a result the air in the passenger cabin 38 is cooled and dehumidified.

In the depicted embodiment, the PCM vessel 26 is located upstream of the core 24. However, it should be appreciated that the first PCM vessel 26 could, alternatively, be located downstream of the core 24 depending upon particular thermal management requirements. The PCM vessel 26 may, for example, be made of a shell-and-tube construction with the phase change material filling the tubes and the second heat exchange fluid flowing on the shell side. The heat insulation could be of a dual-wall vacuum-gap type. Alternatively, or in addition, the PCM vessel 26 could be wrapped with vacuum insulation panel (VIP) material. The PCM vessel 26 typically contains 2-4 kg of phase change material with the latent heat in the 150-350 kJ/kg range and a melting point in the 8°-10° C. temperature range. In winter or at other appropriate times, the air coming from the core 24 could be directed to a separate heater core (not shown) before it enters the passenger cabin 38 in order to raise the air temperature to the level of comfort desired by the vehicle occupants. The heater core may be constructed similar to automotive heater cores commonly used for cabin heating.

During the first mode of operation, a third pump 42 circulates a third heat exchange fluid in the fuel cell stack cooling circuit 28, which includes a fuel cell stack 44 and a second radiator 46. In order to remove heat from the fuel cell stack 44, the third heat exchange fluid is circulated from the fuel cell stack 44 to the second radiator 46 for cooling. Heat from the cooling of the third heat exchange fluid is rejected to the environment through the second radiator 46 using the first blower 33. For purposes of temperature regulation, the fuel cell stack cooling circuit 28 also includes a plurality of conduits and three three-way valves shown as valves 48, 50, and 52, a radiator bypass conduit 54, a high temperature (HT) loop degas bottle 56, and a heater 58 such as a water ethylene glycol (WEG) heater.

In the depicted embodiment, valve 48 is located at an inlet of the fuel cell stack 44 and regulates the circulation of the third heat exchange fluid from the heater 58 to the fuel cell stack 44, a conduit feeding into valve 50, and another conduit feeding into valve 52. Valve 50 is located at an outlet of the third pump 42 and regulates the circulation of the third heat exchange fluid from the third pump 42 and valve 48. Valve 52 is located downstream from valve 50 and regulates the circulation of the third heat exchange fluid between the second radiator 46 and the radiator bypass conduit 54. The HT loop degas bottle 56 is located at a junction outlet between the second radiator 46 and the radiator bypass conduit 54 and regulates the flowrate of the third heat exchange fluid. Lastly, the heater 58 is located between the HT loop degas bottle 56 and valve 48, and is selectively operated to heat the third heat exchange fluid, typically to provide heat to the fuel cell stack 44 during a cold start mode or other appropriate modes of operation.

Figure 3:
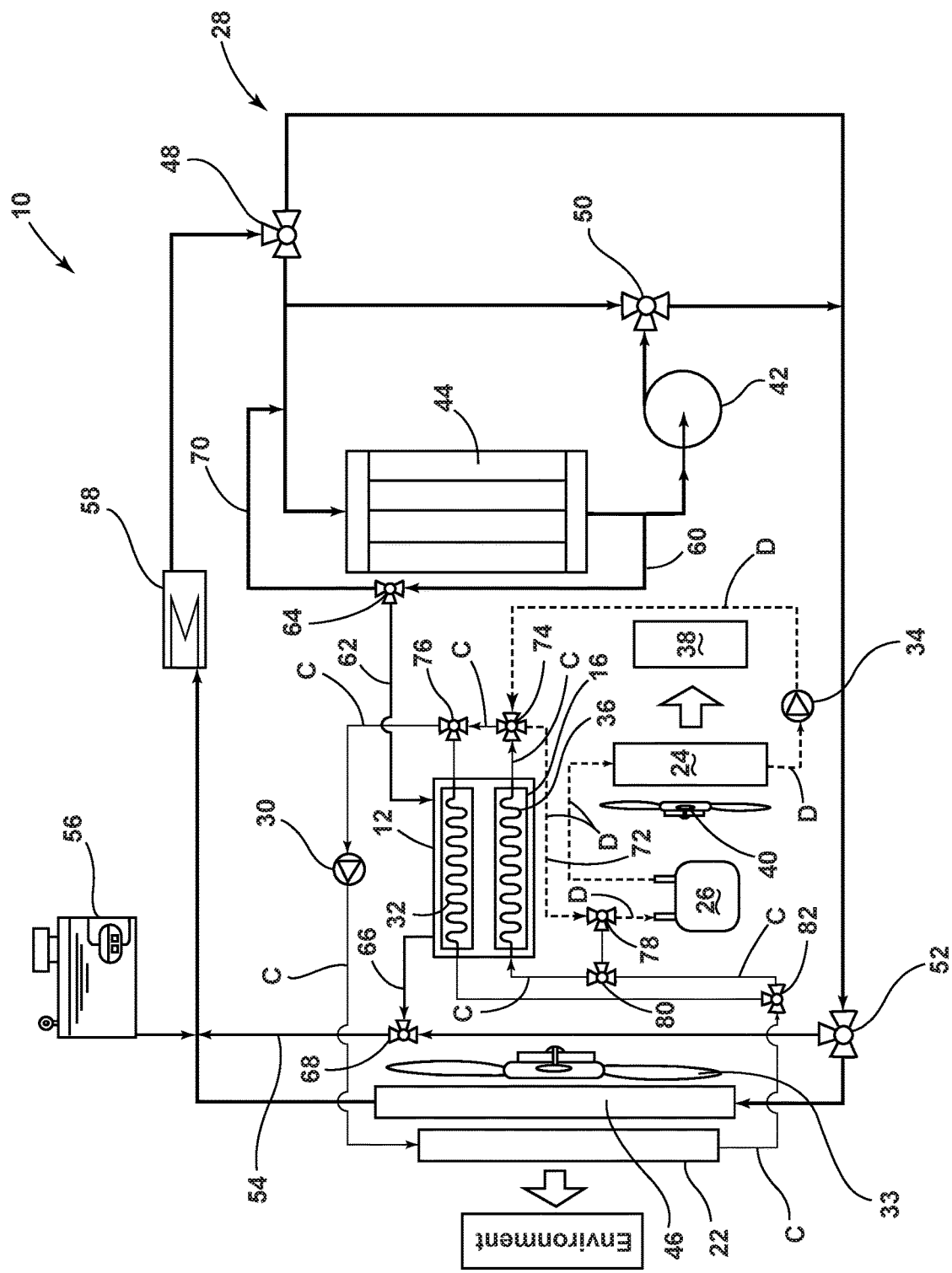
FIG. 3 is a schematic block diagram of the air-conditioning system illustrating a second or desorption/condensation mode of operation.

Turning now to the second or desorption/condensation mode of operation illustrated in FIG. 3, the fuel cell stack cooling circuit 28 diverts at least a portion of the third heat exchange fluid at the outlet of the fuel cell stack 44 and circulates the third heat exchange fluid into the vacuum enclosure 12 in order to regenerate the adsorber 14. Specifically, the third heat exchange fluid is delivered to the vacuum enclosure 12 via a first conduit 60 located between the fuel cell stack 44 and the third pump 42 and fluidly coupled to a second conduit 62 via a first three-way valve shown as valve 64. The heat from the third heat exchange fluid causes the absolute pressure in the vacuum enclosure 12 to rise (e.g., to approximately 10-14 kPa) and the adsorber 14 to desorb by expelling refrigerant vapor stored thereon. Additionally, the adsorber 14 may expel refrigerant vapor that condenses on the surfaces of the evaporator/condenser assembly 16. Subsequently, the third heat exchange fluid flows out of the vacuum enclosure 12 and is returned to the fuel cell stack cooling circuit 28 via a third conduit 66 that is fluidly coupled to the radiator bypass conduit 54 via a second three-way valve shown as valve 68. During the second mode of operation, valve 64 fluidly decouples a fourth conduit 70 that feeds into the inlet of the fuel cell stack 44. However, during the first mode of operation, valves 64 and 68 fluidly decouple the second and third conduits 62, 66 in order to maintain the third heat exchange fluid within the fuel cell stack cooling circuit 28 and prevent the third heat exchange fluid from entering the vacuum enclosure 12. In this way, at least a portion of the third heat exchange fluid may be diverted from the outlet of the fuel cell stack 44 and returned to the inlet of the fuel cell stack 44 via the first and fourth conduits 60, 70 during the first mode of operation. With respect to this disclosure, the first, second, third, and fourth conduits 60, 62, 66, 70 along with valves 64 and 68 collectively define a regeneration circuit for the adsorber 14.

During the second mode of operation, the first pump 30 circulates the first heat exchange fluid through a plurality of conduits collectively defining a third flow path denoted by action arrows C for clarity and ease of understanding. Specifically, the heat of condensation is removed from the condenser of the evaporator/condenser assembly 16 by the circulation of the first heat exchange fluid through the second heat exchange conduit 36 and the first radiator 22. The heat of condensation is rejected to the environment through the first radiator 22 using the first blower 33.

During the second mode of operation, the second pump 34 circulates the second heat exchange fluid through a plurality of conduits collectively defining a fourth flow path denoted by action arrows D for clarity and ease of understanding. In the fourth flow path, the second heat exchange fluid is circulated by the second pump 34 to the PCM vessel 26 and the core 24. Notably, the second heat exchange fluid is thermally decoupled from the evaporator/condenser assembly 16 via a bypass conduit 72 that circulates the second heat exchange fluid to the PCM vessel 26. The frozen phase change material in the PCM vessel 26 cools the second heat exchange fluid that is then circulated to the core 24. The second blower 40 forces air through the core 24 and then into the passenger cabin 38 to provide cooling for the vehicle occupants. As should be appreciated, this allows the uninterrupted delivery of cold air to the cabin while the adsorber 14 is regenerated to be ready for the next adsorption/evaporation mode of the operation cycle.

In one possible embodiment, the air-conditioning system 10 cycles between operating modes every 3 to 12 minutes with the time range being adjusted based on various demand profiles for cooling the passenger cabin 38 and to maximize the frozen phase change material fraction. This helps to maximize the vehicle parking time with the "instant cold" availability at the next vehicle start. Of course, it should also be appreciated that the "instant cold" availability time may be extended by increasing the amount of the phase change material held in the PCM vessel 26, using a phase change material type of a higher latent heat, and/or improving the insulation of the PCM vessel 26.

Figure 2:
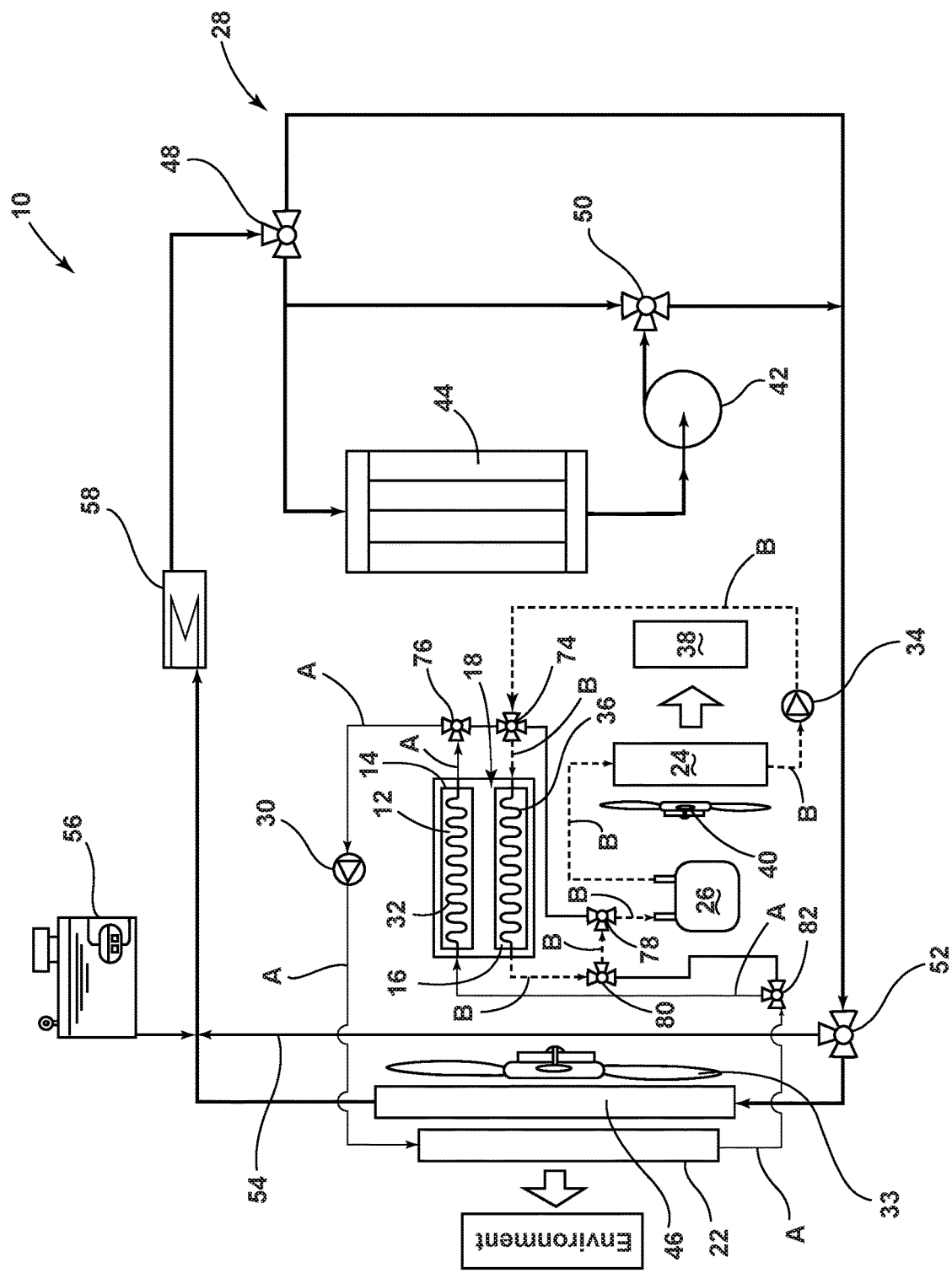
FIG. 2 is a schematic block diagram of the air-conditioning system illustrating a first or adsorption/evaporation mode of operation.

With renewed reference to FIGS. 2 and 3, a conduit and valve system of the air-conditioning system 10 includes the various conduits and valves described above with respect to the circulation of the first, second, and third heat exchange fluids. Additionally, the conduit and valve system includes a four-way valve shown as valve 74 and four three-way valves shown as valves 76, 78, 80, and 82. It is to be understood that the conduit and valve system is configured to control the flow of the first, second, and third heat exchange fluids as the air-conditioning system 10 cycles through the first and second modes of operation.

Specifically, valve 74 is provided at a first terminal of the second heat exchange conduit 36 while valve 80 is provided at a second terminal of the second heat exchange conduit 36. Depending on the mode of operation, the first and second terminals alternate as inlets and outlets of the second heat exchange conduit 36. Valve 76 is located at the outlet of the first heat exchange conduit 32. During the first mode of operation, valve 76 circulates the first heat exchange fluid from the first heat exchange conduit 32 to the first pump 30. During the second mode of operation, valve 76 cooperates with valve 74 to circulate the first heat exchange fluid from the second heat exchange conduit 36 to the first pump 30. Valve 78 is located upstream from the PCM vessel 26 and cooperates with valve 80 to circulate the second heat exchange fluid from the second heat exchange conduit 36 to the PCM vessel 26 during the first mode of operation. During the second mode of operation, valve 78 cooperates with valve 74 to circulate the second heat exchange fluid via bypass conduit 72 to the PCM vessel 26. Valve 82 is located downstream of the first radiator 22 and circulates the first heat exchange fluid to the first heat exchange conduit 32 during the first mode of operation. During the second mode of operation, valve 82 cooperates with valve 80 to circulate the first heat exchange fluid to the second heat exchange conduit 36.

In summary, numerous benefits are provided by the air-conditioning system 10. As should be appreciated, the first radiator 22 effectively replaces the air-conditioning condenser used in a state-of-the-art compressor-driven vehicle air-conditioning system while the core 24 effectively replaces the state-of-the-art evaporator. This eliminates AC accessory loads produced by conventional compressor driven AC systems thereby increasing engine power and fuel economy. Further, by storing cold in the phase change material of the PCM vessel 26, the air-conditioning system 10 provides sustained cooling to the passenger cabin 38 while the adsorber 14 is regenerated. Advantageously, the adsorber 14 is regenerated using waste heat from the fuel cell stack 44 instead of electrical power.

The air-conditioning system 10 functions to provide a simple and efficient method for vehicle climate control which may be broadly described as including the steps of circulating the first heat exchange fluid through the radiator 22 and the first heat exchange conduit 32 and circulating a second heat exchange fluid through the second heat exchange conduit 36, the PCM vessel 26, and the core 24 in the first mode of operation. In contrast, in the second mode of operation, the method includes circulating the first heat exchange fluid through the first radiator 22 and the second heat exchange conduit 36 and circulating the second heat exchange fluid through the PCM vessel 26 and the core 24. The method further includes circulating the third heat exchange fluid from the fuel cell stack to the second radiator in the first mode of operation and circulating at least a portion of the third heat exchange fluid at the outlet of the fuel cell stack 44 into the vacuum enclosure 12 in order to regenerate the adsorber 14 in the second mode of operation.

Advantageously, the air-conditioning system 10 has only a single pair of heat exchangers, such as the adsorber 14 and the evaporator/condenser assembly 16, which provides substantial weight and space savings over prior art adsorber based air-conditioning systems that include multiple adsorber sections. As also disclosed, the air-conditioning system 10 includes only a single vacuum enclosure 12 wherein the adsorber 14 is thermally coupled to the evaporator/condenser assembly 16 so as to operate at maximum efficiency. As a result, the air-conditioning system 10 can more efficiently and effectively cool the passenger cabin 38 for the vehicle occupants while simultaneously allowing the vehicle to be operated with greater fuel economy.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It is also to be understood that variations and modifications can be made on the aforementioned system and method without departing from the concepts of the present disclosure, and further, it is to be understood that such concepts are intended to be covered by the following claims, unless these claims, by their language, expressly state otherwise.

What is claimed is:

1. A method of climate control for a fuel cell vehicle, comprising the steps of:
    circulating a first heat exchange fluid through a first radiator and a first heat exchange conduit, a second heat exchange fluid through a second heat exchange conduit, a vessel, and a core, and a third heat exchange fluid from a fuel cell stack to a second radiator in a first mode of operation such that a temperature of the third heat exchange fluid is decreased at the second radiator;
    circulating the first heat exchange fluid through the first radiator and the second heat exchange conduit, the second heat exchange fluid through the vessel and the core, and at least a portion of the third heat exchange fluid from a fuel cell stack to a vacuum enclosure in a second mode of operation, where the vacuum enclosure contains an adsorber in thermal communication with the first heat exchange conduit, an evaporator/condenser assembly in thermal communication with the second heat exchange conduit, and a refrigerant; and
    circulating the third heat exchange fluid through a heater in the first mode of operation and the second mode of operation, wherein the heater is positioned upstream of the fuel cell stack, and wherein the heater is selectively activated to heat the third heat exchange fluid.

2. The method as claimed in claim 1, wherein during the second mode of operation, the third heat exchange fluid serves to regenerate the adsorber.

3. The method as claimed in claim 1, wherein heat from the third heat exchange fluid causes an absolute pressure in the vacuum enclosure to rise and the adsorber to desorb by expelling refrigerant vapor stored thereon.

4. The method as claimed in claim 1, wherein during the second mode of operation, the third heat exchange fluid is delivered to the vacuum enclosure via a first conduit located at an outlet of the fuel cell stack and fluidly coupled to a second conduit via a first three-way valve.

5. The method as claimed in claim 4, wherein the third heat exchange fluid flows out of the vacuum enclosure via a third conduit that is fluidly coupled to a radiator bypass conduit via a second three-way valve.

6. The method as claimed in claim 5, wherein the first three-way valve fluidly decouples a fourth conduit that feeds into an inlet of the fuel cell stack.

7. The method as claimed in claim 6, wherein during the first mode of operation, the first and second three-way valves fluidly decouple the second and third conduits such that at least a portion of the third heat exchange fluid is diverted from the outlet of the fuel cell stack and returned to the inlet of the fuel stack via the first and fourth conduits.

8. An air-conditioning system for a fuel cell vehicle, comprising:
    a vacuum enclosure having an adsorber in thermal communication with a first heat exchange conduit and an evaporator/condenser assembly in thermal communication with a second heat exchange conduit;
    a first radiator;
    a second radiator;
    a core;
    a vessel containing a phase change material upstream of the core;
    a fuel cell stack;
    a heater positioned upstream of the fuel cell stack; and
    a conduit and valve system configured to:
        circulate a first heat exchange fluid through the first radiator and the first heat exchange conduit, a second heat exchange fluid through the second heat exchange conduit, the vessel, and the core, and a third heat exchange fluid from the fuel cell stack to the second radiator in a first mode of operation such that a temperature of the third heat exchange fluid is decreased at the second radiator;
        circulate the first heat exchange fluid through the first radiator and the second heat exchange conduit, the second heat exchange fluid through the vessel and the core, and at least a portion of the third heat exchange fluid from the fuel cell stack to the vacuum enclosure in a second mode of operation; and
        circulate the third heat exchange fluid through the heater in the first mode of operation and the second mode of operation, wherein the heater is selectively activated to heat the third heat exchange fluid.

9. The air-conditioning system as claimed in claim 8, wherein during the second mode of operation, the third heat exchange fluid serves to regenerate the adsorber.

10. The air-conditioning system as claimed in claim 8, wherein heat from the third heat exchange fluid causes an absolute pressure in the vacuum enclosure to rise and the adsorber to desorb by expelling refrigerant vapor stored thereon.

11. The air-conditioning system as claimed in claim 8, wherein during the second mode of operation, the third heat exchange fluid is delivered to the vacuum enclosure via a first conduit located at an outlet of the fuel cell stack and fluidly coupled to a second conduit via a first three-way valve.

12. The air-conditioning system as claimed in claim 11, wherein the third heat exchange fluid flows out of the vacuum enclosure via a third conduit that is fluidly coupled to a radiator bypass conduit via a second three-way valve.

13. The air-conditioning system as claimed in claim 12, wherein the first three-way valve fluidly decouples a fourth conduit that feeds into an inlet of the fuel cell stack.

14. The air-conditioning system as claimed in claim 13, wherein during the first mode of operation, the first and second three-way valves fluidly decouple the second and third conduits such that at least a portion of the third heat exchange fluid is diverted from the outlet of the fuel cell stack and returned to the inlet of the fuel stack via the first and fourth conduits.

15. An air-conditioning system for a fuel cell vehicle, comprising:
   a vacuum enclosure having an adsorber in thermal communication with a first heat exchange conduit and an evaporator/condenser assembly in thermal communication with a second heat exchange conduit;
   a first radiator;
   a second radiator;
   a core;
   a vessel containing a phase change material upstream of the core;
   a fuel cell stack;
   a heater positioned upstream of the fuel cell stack; and
   a conduit and valve system configured to:
      circulate a first heat exchange fluid through the first radiator and the first heat exchange conduit, a second heat exchange fluid through the second heat exchange conduit, the vessel, and the core, and a third heat exchange fluid from the fuel cell stack to the second radiator in a first mode of operation;
      circulate the first heat exchange fluid through the first radiator and the second heat exchange conduit, the second heat exchange fluid through the vessel and the core, and at least a portion of the third heat exchange fluid from the fuel cell stack to the vacuum enclosure in a second mode of operation, wherein during the second mode of operation the third heat exchange fluid is delivered to the vacuum enclosure via a first conduit located at an outlet of the fuel cell stack and fluidly coupled to a second conduit via a first three-way valve, wherein the third heat exchange fluid flows out of the vacuum enclosure via a third conduit that is fluidly coupled to a radiator bypass conduit via a second three-way valve, and wherein the first three-way valve fluidly decouples a fourth conduit that feeds into an inlet of the fuel cell stack; and
      circulate the third heat exchange fluid through the heater in the first mode of operation and the second mode of operation, wherein the heater is selectively activated to heat the third heat exchange fluid;
   wherein during the second mode of operation, the third heat exchange fluid serves to regenerate the adsorber.

16. The air-conditioning system as claimed in claim 15, wherein heat from the third heat exchange fluid causes an absolute pressure in the vacuum enclosure to rise and the adsorber to desorb by expelling refrigerant vapor stored thereon.

17. The air-conditioning system as claimed in claim 15, wherein during the first mode of operation, the first and second three-way valves fluidly decouple the second and third conduits such that at least a portion of the third heat exchange fluid is diverted from the outlet of the fuel cell stack and returned to the inlet of the fuel stack via the first and fourth conduits.

\* \* \* \* \*